US012593211B2

(12) United States Patent
Ueno et al.

(10) Patent No.: US 12,593,211 B2
(45) Date of Patent: Mar. 31, 2026

(54) SELECTIVE VEHICLE SECURITY LOG DATA COMMUNICATION CONTROL

(71) Applicant: NTT Docomo Business, Inc., Tokyo (JP)

(72) Inventors: Satoshi Ueno, Tokyo (JP); Haruki Oda, Yokohama (JP); Atsushi Wakasugi, Yokohama (JP)

(73) Assignee: NTT Docomo Business, Inc., Tokyo (JP)

( * ) Notice: Subject to any disclaimer, the term of this patent is extended or adjusted under 35 U.S.C. 154(b) by 346 days.

(21) Appl. No.: 17/369,774

(22) Filed: Jul. 7, 2021

(65) Prior Publication Data

US 2021/0337387 A1     Oct. 28, 2021

Related U.S. Application Data

(63) Continuation of application No. PCT/JP2020/000209, filed on Jan. 8, 2020.

(30) Foreign Application Priority Data

Jan. 10, 2019     (JP) ................................. 2019-002747

(51) Int. Cl.
*H04W 12/12*          (2021.01)
*H04L 9/40*           (2022.01)
(Continued)

(52) U.S. Cl.
CPC ....... *H04W 12/122* (2021.01); *H04L 63/1425* (2013.01); *H04W 4/48* (2018.02); *H04W 12/08* (2013.01); *H04W 28/06* (2013.01)

(58) Field of Classification Search
CPC ..... H04W 12/122; H04W 4/48; H04W 12/08; H04W 28/06; H04W 12/121;
(Continued)

(56) References Cited

U.S. PATENT DOCUMENTS 9,389,147 B1 *   7/2016   Lambert ................ G01C 21/20
9,721,399 B2     8/2017   Ishikawa
(Continued)

FOREIGN PATENT DOCUMENTS

CN          106919163 A       7/2017
DE     10 2017 202 176 A1     8/2018
(Continued)

OTHER PUBLICATIONS

Extended European Search Report for EP Application No. 20745612. 0, dated Feb. 10, 2022, 9 pages.
(Continued)

*Primary Examiner* — Harunur Rashid
(74) *Attorney, Agent, or Firm* — Knobbe, Martens, Olson & Bear, LLP

(57)          ABSTRACT

According to one embodiment, a vehicle information processing apparatus used together with an in-vehicle network having a function of generating log data concerning an operation state of an in-vehicle device is provided. The apparatus comprises a log data acquirer configured to acquire the generated log data, and an output controller configured to control to set an output destination of the acquired log data to one or both of a vehicle security monitoring device communicable with the in-vehicle network and a user terminal connectable to the in-vehicle network.

5 Claims, 5 Drawing Sheets

(51) Int. Cl.

| | | |
|---|---|---|
| *H04W 4/48* | (2018.01) | |
| *H04W 12/08* | (2021.01) | |
| *H04W 12/122* | (2021.01) | |
| *H04W 28/06* | (2009.01) | |

(58) Field of Classification Search

CPC ............. H04L 63/1425; H04L 12/2825; G06F 11/3013; G06F 11/3082; G06F 11/3476; G06F 21/552

See application file for complete search history.

(56) References Cited

U.S. PATENT DOCUMENTS

| | | | | |
|---|---|---|---|---|
| 2005/0010697 | A1* | 1/2005 | Kinawi .................. | H04L 47/10 |
| | | | | 710/1 |
| 2007/0038338 | A1 | 2/2007 | Larschan et al. | |
| 2011/0130905 | A1* | 6/2011 | Mayer .................. | G07C 5/008 |
| | | | | 340/439 |
| 2012/0029763 | A1* | 2/2012 | Hering .................. | G07C 5/008 |
| | | | | 701/29.6 |
| 2015/0094877 | A1 | 4/2015 | Tahnoose et al. | |
| 2015/0160019 | A1* | 6/2015 | Biswal .................. | G06Q 50/01 |
| | | | | 701/1 |
| 2015/0191135 | A1 | 7/2015 | Ben Noon et al. | |
| 2016/0171801 | A1* | 6/2016 | Kim ..................... | G06F 40/205 |
| | | | | 701/1 |
| 2017/0270490 | A1 | 9/2017 | Penilla et al. | |
| 2018/0294991 | A1* | 10/2018 | Tsurumi ................. | H04L 12/46 |
| 2018/0295147 | A1* | 10/2018 | Haga ..................... | H04L 67/12 |
| 2018/0351980 | A1 | 12/2018 | Galula | |
| 2019/0043354 | A1* | 2/2019 | Oluwafemi ............ | H04L 67/12 |
| 2019/0050904 | A1 | 2/2019 | Wasserman et al. | |
| 2019/0182275 | A1 | 6/2019 | Ando et al. | |
| 2019/0371085 | A1* | 12/2019 | Kishikawa .............. | G07C 5/02 |
| 2020/0104509 | A1 | 4/2020 | Furuichi et al. | |
| 2020/0216097 | A1 | 7/2020 | Galula et al. | |
| 2021/0344700 | A1 | 11/2021 | Ueno et al. | |

FOREIGN PATENT DOCUMENTS

| | | | | | |
|---|---|---|---|---|---|
| JP | 2008-269401 | A | | 11/2008 | |
| JP | 2015-136107 | A | | 7/2015 | |
| JP | 2015-225574 | A | | 12/2015 | |
| JP | 2017-111796 | | | 6/2017 | |
| JP | 2017216583 | A | * | 12/2017 | |
| JP | 2018-32254 | A | | 3/2018 | |
| JP | 2018032254 | A | * | 3/2018 | .............. G06F 11/07 |
| JP | 2018-081349 | | | 5/2018 | |
| JP | 2018-81349 | A | | 5/2018 | |
| WO | WO 2012/080741 | A1 | | 6/2012 | |
| WO | WO 2018/065973 | A1 | | 4/2018 | |
| WO | WO 2020/145279 | A1 | | 7/2020 | |
| WO | WO 2020/153122 | A1 | | 7/2020 | |

OTHER PUBLICATIONS

Extended European Search Report for EP Application No. 20738799.4, dated Feb. 11, 2022, 9 pages.

International Search Report and Written Opinion for PCT Application No. PCT/JP2020/000285, dated Feb. 10, 2020, in 18 pages.

International Preliminary Report on Patentability for Application No. PCT/JP2020/000285, dated Jul. 29, 2021, in 16 pages.

International Search Report and Written Opinion for PCT Application No. PCT/JP2020/000209, dated Mar. 24, 2020, in 27 pages.

International Preliminary Report on Patentability (IPRP) for Application No. PCT/JP2020/000209, dated Jul. 22, 2021, in 20 pages.

Japanese Office Action for JP Application No. 2019-002747, dated Jul. 19, 2022, in 8 pages.

International Search Report for PCT Application No. PCT/JP2020/000209, dated Mar. 24, 2020, in 10 pages (including translation).

Chinese Office Action for CN Application No. 202080010092.5, dated May 22, 2023, 25 pages.

International Preliminary Report on Patentability (IPRP) for Application No. PCT/JP2020/000209, dated Jun. 16, 2021, in 13 pages.

International Preliminary Report on Patentability (IPRP) for Application No. PCT/JP2020/000285, dated Jun. 16, 2021, in 11 pages.

International Search Report for PCT Application No. PCT/JP2020/000285, dated Feb. 10, 2020, in 2 pages.

Japanese Office Action for JP Application No. 2019-007916, dated May 10, 2022, in 11 pages.

U.S. Appl. No. 17/377,855, Vehicle Security Monitoring Apparatus, Method and Non-Transitory Computer Readable Medium, filed Jul. 16, 2021.

Extended European Search Report for EP Application No. 20738799.4, dated Jul. 7, 2023, 4 pages.

\* cited by examiner

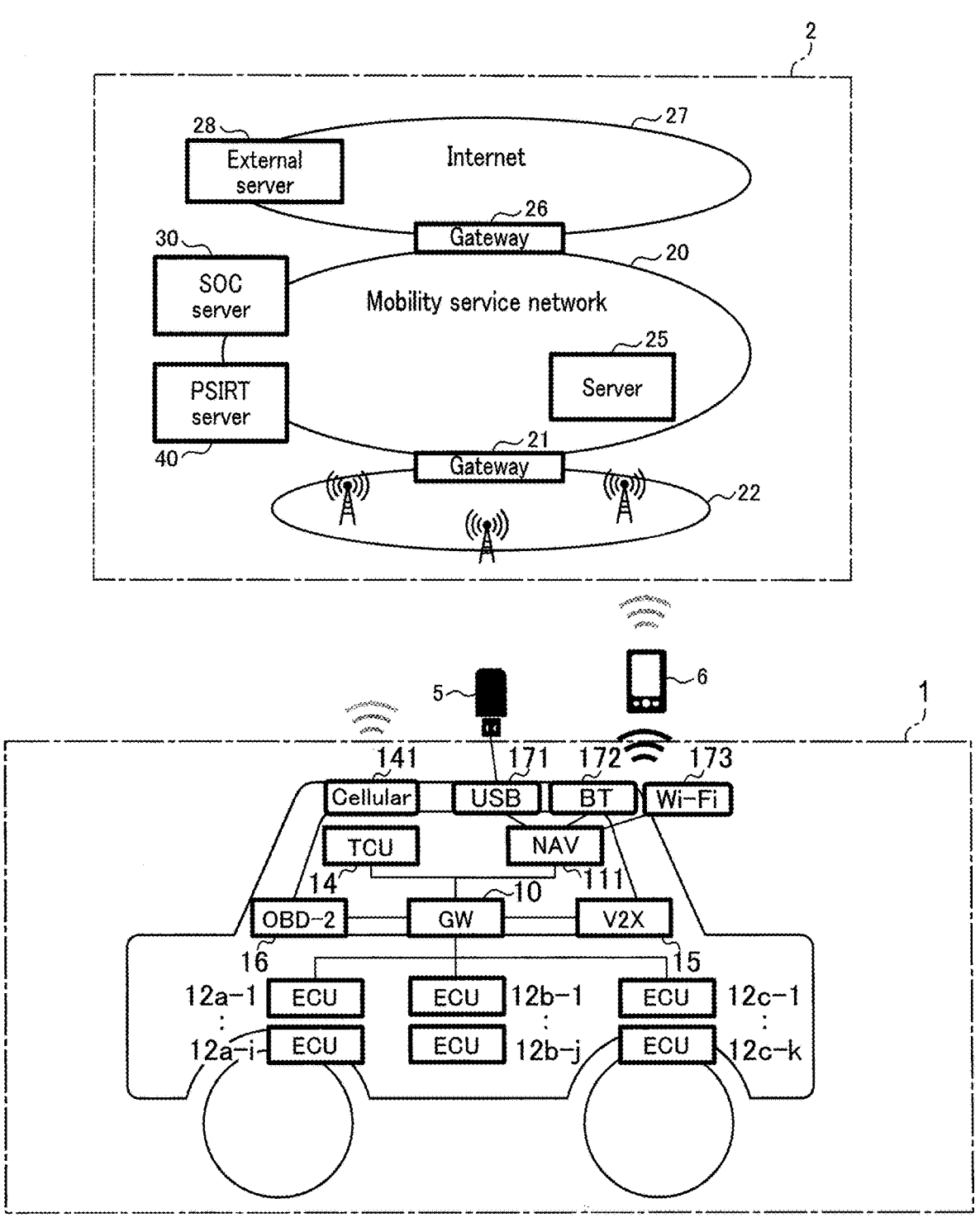
F I G. 1

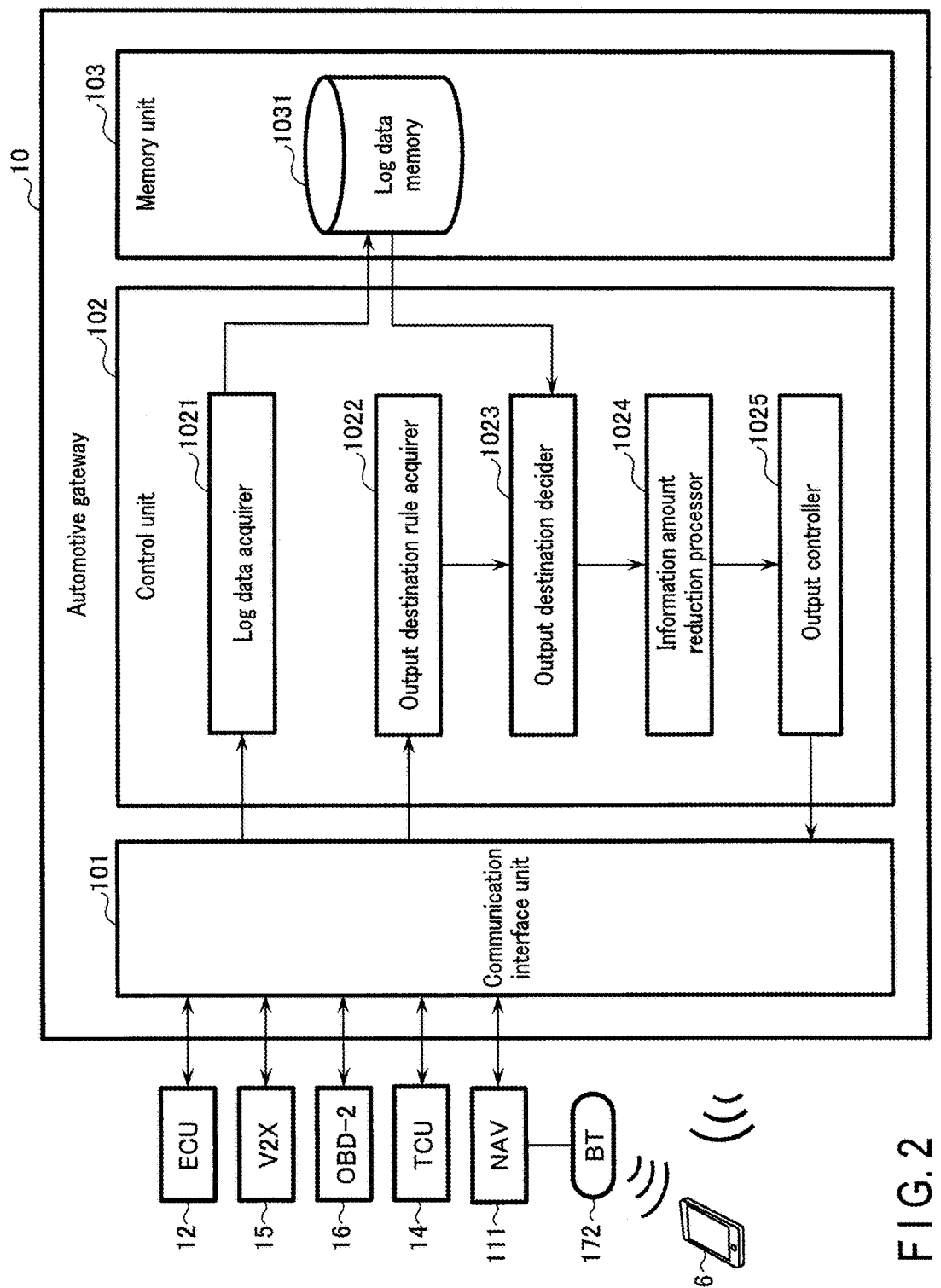
F I G. 2

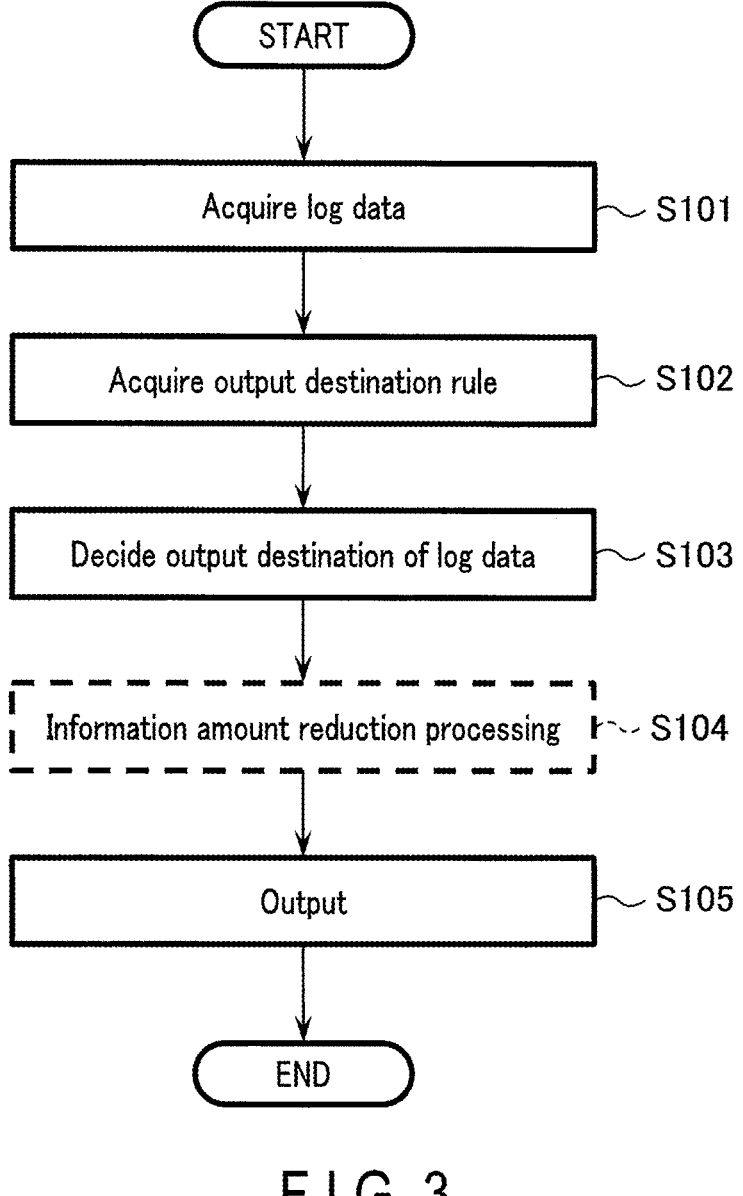
F I G. 3

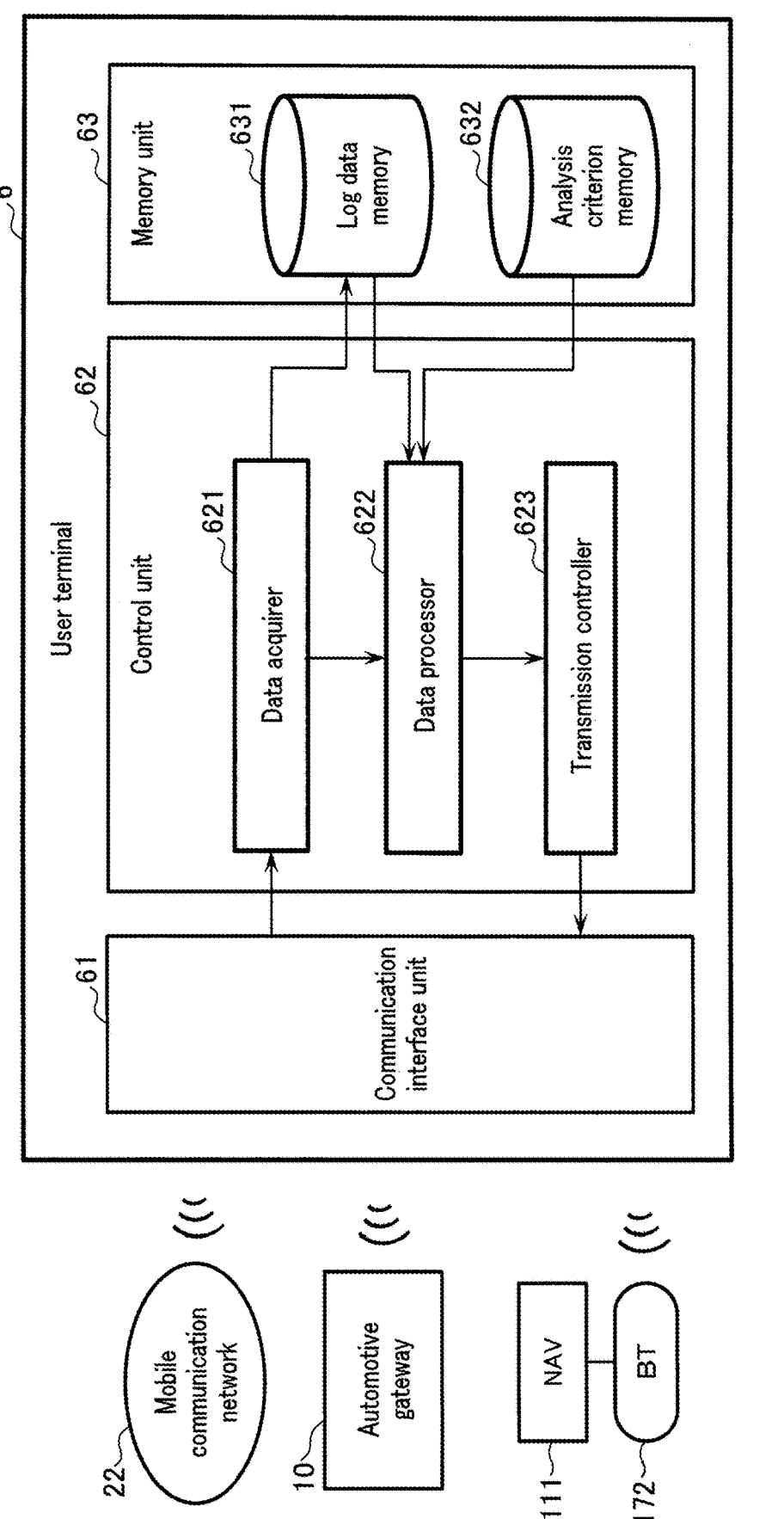
F I G. 4

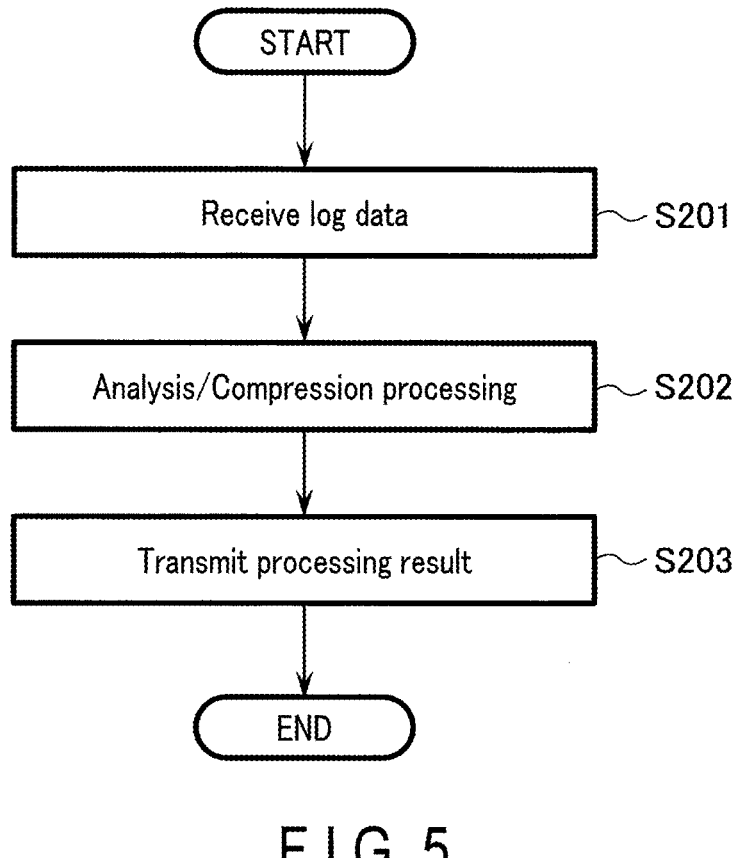
F I G. 5

SELECTIVE VEHICLE SECURITY LOG DATA COMMUNICATION CONTROL

CROSS-REFERENCE TO RELATED APPLICATIONS

This application is a Continuation Application of PCT Application No. PCT/JP2020/000209, filed Jan. 8, 2020 and based upon and claiming the benefit of priority from Japanese Patent Application No. 2019-002747, filed Jan. 10, 2019, the entire contents of all of which are incorporated herein by reference.

FIELD

One aspect of the present invention relates to, for example, a vehicle information processing apparatus mounted on a vehicle such as an automobile, a user terminal, an information processing method, and a program.

BACKGROUND

On a recent vehicle such as an automobile, many ECUs (Electronic Control Units) such as a vehicle control unit forming a navigation system, a vehicle control unit for electronically controlling various in-vehicle equipments including an engine and brake, and a vehicle control unit for controlling equipments including a meter for displaying various states of the vehicle are mounted. In the vehicle, these ECUs are electrically connected by a communication line to form an in-vehicle network, and transmit/receive data to/from each other via the in-vehicle network.

Since the respective ECUs connected to the in-vehicle network control the in-vehicle equipments such as the engine and brake mounted on the vehicle, the in-vehicle network is required to have extremely high security.

Thus, to ensure the security of the in-vehicle network, for example, it has been examined to introduce intrusion detection for detecting unauthorized access by a method such as fraud detection for performing signature matching with data registered in advance or abnormality detection for detecting, as an abnormality, an operation different from a normal operation. As one method, there is known a falsification detection system including a verification server, a verifying ECU, and a verified ECU (for example, see Jpn. Pat. Appln. KOKAI Publication No. 2018-081349).

SUMMARY

According to the first aspect of a vehicle information processing apparatus of the present invention is a vehicle information processing apparatus used together with an in-vehicle network having a function of generating log data concerning an operation state of an in-vehicle device, comprising a log data acquirer configured to acquire the generated log data, and an output controller configured to control to set an output destination of the acquired log data to one or both of a vehicle security monitoring device communicable with the in-vehicle network and a user terminal connectable to the in-vehicle network.

According to the second aspect of the vehicle information processing apparatus of the present invention, in the first aspect, the output controller controls the output destination of the log data based on priority set for each generation source in-vehicle device of the log data or each type of the log data.

According to the third aspect of the vehicle information processing apparatus of the present invention, in the first aspect, the output controller controls the output destination of the log data in accordance with one of a request sent from the vehicle security monitoring device and a request accepted from the user terminal.

According to the fourth aspect of the vehicle information processing apparatus of the present invention, in the first aspect, the output controller controls the output destination of the log data based on a magnitude of an information amount of the log data acquired per unit time.

The fifth aspect of the vehicle information processing apparatus of the present invention further comprises a memory configured to accumulate the acquired log data, and an information amount reduction processor configured to perform processing of reading out the accumulated log data from the memory for every predetermined amount and reducing an information amount of the log data before output to the output destination.

The first aspect of a user terminal of the present invention is a user terminal for receiving log data from a vehicle information processing apparatus used together with an in-vehicle network having a function of generating the log data concerning an operation state of an in-vehicle device, comprising a data acquirer configured to acquire the log data output from the vehicle information processing apparatus, a data analysis processor configured to perform analysis processing for the acquired log data for every predetermined amount or every predetermined period, and a transmission controller configured to transmit an analysis result of the data analysis processor to a vehicle security monitoring device communicable with the in-vehicle network.

The second aspect of the user terminal of the present invention is a user terminal for receiving log data from a vehicle information processing apparatus used together with an in-vehicle network having a function of generating the log data concerning an operation state of an in-vehicle device, comprising a data acquirer configured to acquire the log data output from the vehicle information processing apparatus, a data compression processor configured to perform compression processing for the acquired log data for every predetermined amount or every predetermined period, and a transmission controller configured to transmit, to a vehicle security monitoring device communicable with the in-vehicle network, the log data compressed by the data compression processor.

The third aspect of the user terminal of the present invention is a user terminal for receiving log data from a vehicle information processing apparatus used together with an in-vehicle network having a function of generating the log data concerning an operation state of an in-vehicle device, comprising a data acquirer configured to acquire the log data output from the vehicle information processing apparatus, a prioritization processor configured to prioritize the acquired log data, and a transmission controller configured to preferentially transmit, based on a result of the prioritization by the prioritization processor, the log data having high priority to a vehicle security monitoring device communicable with the in-vehicle network.

According to the first aspect of the vehicle information processing apparatus of the present invention, the log data concerning the operation state of the in-vehicle device, which is generated in the in-vehicle network, is selectively output to one or both of the vehicle security monitoring device communicable with the in-vehicle network and the user terminal connectable to the in-vehicle network. This distributes and outputs the log data generated in the in-vehicle network to at least two paths, thereby making it possible to reduce traffic in the network per unit time and reduce congestion. Furthermore, by controlling to output the log data collected in the in-vehicle network to both the vehicle security monitoring device and the user terminal, it is possible to perform, for example, processing of backing up log data having high importance in the user terminal and retransmitting it while transmitting the log data to the vehicle security monitoring device in real time.

According to the second aspect of the vehicle information processing apparatus of the present invention, the output destination of the log data is selected based on priority set for each generation source in-vehicle device of the log data or each type of the log data. For example, this sends log data having high priority to the vehicle security monitoring device in real time, and sends log data having low priority to the vehicle security monitoring device via the user terminal. Therefore, it is possible to more smoothly transmit the log data having high priority without any transmission delay.

According to the third aspect of the vehicle information processing apparatus of the present invention, the output destination is controlled in accordance with one of the request sent from the vehicle security monitoring device and the request accepted from the user terminal. This can perform appropriate distribution output in consideration of an operation environment, a network environment, and the like by, for example, temporarily stopping output to the request source device in response to a standby request from the vehicle security monitoring device or the user terminal.

According to the fourth aspect of the vehicle information processing apparatus of the present invention, the output destination of the data is controlled based on the magnitude of the information amount of the log data acquired per unit time. This can perform, for example, processing of transmitting, to the vehicle security monitoring device in real time, log data whose information amount acquired per unit time is small, and temporarily accumulating, in the user terminal, log data whose information amount is large, and then transferring the accumulated log data to an external server.

According to the fifth aspect of the vehicle information processing apparatus of the present invention, the log data generated in the in-vehicle network is accumulated in the vehicle information processing apparatus, is read out for every predetermined amount, and undergoes processing of reducing the information amount before output. This can further reduce the traffic and distribute the processing load.

According to the first aspect of the user terminal of the present invention, upon receiving the log data from the vehicle information processing apparatus, the user terminal performs the analysis processing for the received log data for every predetermined amount or every predetermined period, and transmits the analysis result to the vehicle security monitoring device. This can cause the user terminal to perform the analysis processing of the log data, thereby distributing the processing load.

According to the second aspect of the user terminal of the present invention, upon receiving the log data from the vehicle information processing apparatus, the user terminal performs the compression processing for the received log data for every predetermined amount or every predetermined period, and transmits the compressed log data to the vehicle security monitoring device. This can distribute the processing load by causing the user terminal to perform the compression processing of the log data, and reduce the traffic by reducing the transmission data amount.

According to the third aspect of the user terminal of the present invention, upon receiving the log data from the vehicle information processing apparatus, the user terminal prioritizes the received log data, and preferentially transmits the log data having high priority to the vehicle security monitoring device. This allows the user terminal to perform traffic control by transmitting log data having high priority to the vehicle security monitoring device with a low delay and transmitting log data having low priority during a time period in which the network is not congested.

That is, according to each aspect of the present invention, there can be provided a technique of making it possible to more smoothly transmit log data from an in-vehicle network mounted on a vehicle such as an automobile to an external server.

BRIEF DESCRIPTION OF THE DRAWINGS

FIG. 1 is a block diagram showing the overall arrangement of a vehicle information communication system including a vehicle information processing apparatus according to an embodiment of the present invention;

FIG. 2 is a block diagram showing the functional arrangement of the vehicle information processing apparatus according to the embodiment of the present invention;

FIG. 3 is a flowchart illustrating a control procedure and control contents by the vehicle information processing apparatus shown in FIG. 2;

FIG. 4 is a block diagram showing the functional arrangement of a user terminal according to the embodiment of the present invention; and FIG. 5 is a flowchart illustrating a processing procedure and processing contents by the user terminal shown in FIG. 4.

DETAILED DESCRIPTION

Embodiments according to the present invention will be described below with reference to the accompanying drawings.

To monitor the security of such in-vehicle network, the operation of a SOC (Security Operation Center) has received attention. Since, however, an enormous amount of log data collected in the in-vehicle network is transferred from many vehicles to the SOC, an increase in traffic in the network becomes a problem.

The embodiments provide a technique of making it possible to smoothly transmit log data from an in-vehicle network mounted on a vehicle such as an automobile to an external server.

One Embodiment (Arrangement)

(1) System

FIG. 1 is a block diagram showing the overall arrangement of a vehicle information communication system including a vehicle information processing apparatus according to the embodiment of the present invention.

The vehicle information communication system according to the embodiment includes, for example, an in-vehicle network 1 created in a vehicle, and an external network 2 capable of communicating with the in-vehicle network 1. The external network 2 includes, for example, a mobile communication network 22, a mobility service network 20, and the Internet 27. The mobility service network 20 is connected to a mobility service server 25 for managing various kinds of data concerning a mobility service, a SOC server 30 operated by a SOC (Security Operation Center), and a PSIRT server 40 operated by a PSIRT (Product Security Incident Response Team).

The mobility service network 20 includes gateways 21 and 26. The gateway 21 is connected to the mobile communication network 22 for performing wireless communication with the vehicle. The mobile communication network 22 forms a mobile closed network, and performs wireless data communication with the in-vehicle network 1 mounted on the vehicle. As the mobile communication network 22, for example, a cellular mobile communication network or a wireless LAN (Local Area Network) is used.

On the other hand, the gateway 26 can connect the mobility service network 20 to an external server 28 via the Internet 27. The external server 28 is operated and managed by, for example, the Auto-ISAC (Automotive Information Sharing and Analysis Center), includes a database that accumulates information concerning connected car cyber attacks and potential vulnerabilities, and provides the information accumulated in the database to the SOC. The external server 28 may also include, for example, a personal computer or a server operated by the system department of a vehicle manufacturer, an in-vehicle device manufacturer, or the like.

The SOC server 30 is operated by the SOC for monitoring the security of the in-vehicle network, as described above, and operates as a vehicle security monitoring device. The SOC server 30 acquires information concerning connected car cyber attacks and potential vulnerabilities from the external server 28 and the PSIRT server 40. On the other hand, the SOC server 30 receives log data generated in the in-vehicle network 1 of each vehicle, and analyzes it, thereby detecting an abnormal operation or a cyber attack and making a notification of it.

The PSIRT server 40 is operated by the PSIRT. The PSIRT is an organization for performing necessary safety control, support, and incident response through the development life cycle of an in-vehicle equipment or a vehicle manufacturer. For example, the PSIRT server 40 includes an arrangement information database of the vehicle unique to the manufacturer, and transmits attack information to the SOC in response to a request from the SOC. For example, the PSIRT decides a policy and the like unique to the manufacturer based on a security analysis report provided from the SOC, and the PSIRT server 40 has a function of transmitting, to the vehicle, a recall instruction corresponding to the policy.

The in-vehicle network 1 is also called, for example, a CAN (Control Area Network), and includes an automotive gateway (GW) 10. In the CAN, communication data is transmitted/received in a message addressing format using an "ID". The ID includes information that plays the role of communication arbitration within a bus in addition to information for identifying data contents and a transmission node.

The automotive gateway 10 performs data routing between a port and each device provided in the in-vehicle network 1 and accumulates data. The automotive gateway 10 is connected to a plurality of electronic control units (ECUs) via, for example, the bus using a signal cable. Referring to FIG. 1, examples of the ECUs are power system ECUs 12*a*-1, . . . , 12*a*-*i* such as an engine ECU and a transmission ECU, body system ECUs 12*b*-1, . . . , 12*b*-*j* such as a power window ECU and a suspension ECU, and information system ECUs 12*c*-1, . . . , 12*c*-*k* such as a car audio ECU but are not limited to them. These ECUs will collectively be referred to as "ECUs 12" hereinafter.

The ECUs 12 are each configured to perform a predetermined control function by causing a processor to execute a program, and are used as, for example, units respectively for controlling an engine, transmission, steering angle, accelerator, brake, and the like, units respectively for controlling a turn signal, light, and wiper, units respectively for controlling door locking and opening/closing of a window, a unit for controlling air-conditioning, and the like. Furthermore, in addition to measurement data of various vehicle sensors associated with the operation state of the vehicle, such as a speed sensor, temperature sensor, and vibration sensor, many sensors such as an inside sensor for monitoring the state of a driver and an outside sensor for monitoring the status outside the vehicle are provided in the vehicle, and the ECUs 12 are also used as units for loading sensing data output from these sensors. In addition, the ECUs 12 are also used as an automated driving control unit and a unit for monitoring the state of the driver.

Each ECU 12 transmits/receives data using a message complying with the CAN protocol. Each ECU can also acquire sensing data from an application program operating on another ECU via the automotive gateway 10.

In addition to the above-described ECUs 12, the automotive gateway 10 is connected to a navigation device (NAV) 111, a communication control unit (TCU) 14, a sensor interface (V2X) 15 for receiving detection data by a sensor group of an in-vehicle camera and the like, and an external interface port (OBD-2) 16 to externally transmit/receive or input/output data.

The navigation device 111 gives route guidance to the driver of the vehicle by screen display or audio output, and also presents various kinds of information including road traffic information. The navigation device 111 is connected to a USB port 171, a Bluetooth® (BT) interface 172, and a Wi-Fi® interface 173. These are respectively used to write and read data in and from a USB memory 5, transmit/receive data to/from a user terminal 6 such as a smartphone held by the driver, and transmit/receive data to/from the user terminal 6 or an external equipment.

The communication control unit (TCU) 14 performs wireless communication with the mobile communication network 22, and is used to transmit/receive speech communication data of the driver, receive navigation data from a Web site, and transmit, to the SOC, log data representing the operation states of the above-described ECUs 12. Note that reference numeral 141 denotes a wireless unit (cellular) including an antenna.

The sensor interface (V2X) 15 is mainly used to load sensing data output from the outside sensor. The outside sensor includes, for example, an outside camera and a radar. The outside camera is used to capture, for example, obstacles, peripheral vehicles, traffic signals, pedestrians, and the like outside the vehicle.

The external interface port (OBD-2) 16 is used to, for example, test each ECU 12 and install an update program and control data in each ECU 12, and is connected to a test device or a personal computer.

(2) Automotive Gateway

FIG. 2 is a block diagram showing the functional arrangement of the automotive gateway 10 serving as a vehicle information processing apparatus according to the embodiment of the present invention.

The automotive gateway 10 functions as a central gateway, and includes a communication interface unit 101, a control unit 102, and a memory unit 103 in addition to general components (protocol translator, impedance matching device, communication rate converter, fault isolator, and the like) necessary to interconnect the networks.

The communication interface unit 101 includes a wired or wireless communication interface, and makes it possible to transmit/receive information to/from an external equipment under the control of the control unit 102. For example, a wired LAN is used as the wired interface, and an interface adopting a low power wireless data communication standard such as Bluetooth or BLE (Bluetooth Low Energy) is used as the wireless interface. The automotive gateway 10 can transmit/receive data to/from the ECUs 12, the sensor interface (V2X) 15, the external interface port (OBD-2) 16, the TCU 14, and the navigation device 111 via the communication interface unit 101 using a protocol defined in the in-vehicle network 1. The automotive gateway 10 can also transmit/receive, via the TCU 14, data to/from a server (the mobility service server 25 on the mobility service network, the SOC server 30, the PSIRT server 40, the external server 28, or the like) connected to the external network 2. The automotive gateway 10 can further transmit/receive data to/from the user terminal 6 directly through the communication interface unit 101 or via the Bluetooth interface 172 of the navigation device 111.

The memory unit 103 is formed as a storage medium by combining, for example, a nonvolatile memory that is appropriately writable and readable such as an HDD (Hard Disk Drive) or SSD (Solid State Drive), a nonvolatile memory such as a ROM (Read Only Memory), and a volatile memory such as a RAM (Random Access Memory). In the memory area, a program memory area and a data memory area are provided. The program memory area stores programs necessary to execute various control processes according to the embodiment of the present invention. The data memory area is provided with a log data memory 1031.

The log data memory 1031 is used to store log data acquired from the in-vehicle network 1. The log data includes arbitrary log data such as an operation log, manipulation log, authentication log, access log, event log, communication log, and security log. As an example of the security log, the state of the network is displayed by monitoring the state of a transmitted/received packet by the function of a firewall. Note that the data memory 1031 has an arbitrary arrangement and can be eliminated.

The control unit 102 includes, for example, a hardware processor such as a CPU (Central Processing Unit), and includes, as control functions for implementing the embodiment of the present invention, a log data acquirer 1021, an output destination rule acquirer 1022, an output destination decider 1023, an information amount reduction processor 1024, and an output controller 1025. These control function units are implemented by causing the hardware processor to execute the programs stored in the program memory area of the memory unit 103.

The log data acquirer 1021 performs processing of acquiring, from the in-vehicle network 1 via the communication interface unit 101, log data generated based on the operation states of the in-vehicle equipments including the ECUs 12, and storing the acquired log data in the log data memory 1031.

The output destination rule acquirer 1022 performs processing of acquiring a preset output destination rule from an external equipment, a server on the network, or the like via the communication interface unit 101, and transferring the acquired output destination rule to the output destination decider 1023. The output destination rule is a rule for selectively controlling the output destination of the acquired data, and is arbitrarily preset by a system administrator or the like. The automotive gateway 10 may include, in the memory unit 103, a memory for storing the acquired output destination rule or a buffer memory for temporarily saving the acquired output destination rule.

The output destination decider 1023 performs processing of deciding the output destination of the log data based on the acquired output destination rule.

The information amount reduction processor 1024 is optionally provided, and performs processing of reducing the information amount of transmission target log data, as needed.

The output controller 1025 performs processing of generating log data for transmission by adding destination information of the decided output destination to the transmission target log data, and outputting the generated log data.

(3) User Terminal

FIG. 4 is a block diagram showing the functional arrangement of the user terminal 6 according to the embodiment of the present invention.

The user terminal 6 is, for example, an arbitrary information processing terminal having a communication function and portable by a user, such as a smartphone, a tablet terminal, or a personal computer, and includes a communication interface unit 61, a control unit 62, and a memory unit 63 in addition to general functions (an input/output interface, an input function unit, a display function unit, and the like) necessary for information processing.

The communication interface unit 61 includes a wired or wireless interface for making it possible to transmit/receive information to/from the automotive gateway 10 or the navigation device 111 in addition to a wireless interface for making it possible to transmit/receive information to/from the mobile communication network 22.

The memory unit 63 uses, for example, a semiconductor memory such as a flash memory as a storage medium. Note that as the storage medium, a read-only memory such as a ROM or a volatile memory such as a RAM can be used. In the memory area, a program memory area and a data memory area are provided. The program memory area stores programs necessary to execute various control processes according to the embodiment of the present invention. In the data memory area, a log data memory 631 and an analysis criterion memory 632 are provided.

The log data memory 631 is used to store log data received from the automotive gateway 10.

The analysis criterion memory 632 is used to store various criteria to be used to perform analysis processing for the received log data. For example, the analysis criteria include a threshold and a reference waveform to be used for abnormality detection.

The control unit 62 includes, for example, a hardware processor such as a CPU, and includes a data acquirer 621, a data processor 622, and a transmission controller 623 as control functions for implementing the embodiment of the present invention. These control function units are implemented by causing the hardware processor to execute the programs stored in the program memory area of the memory unit 63.

The data acquirer 621 performs processing of acquiring, via the communication interface unit 61, log data transmitted from the automotive gateway 10, and storing the acquired log data in the log data memory 631.

The data processor 622 functions as a data analysis processor, a data compression processor, or a prioritization processor to perform various processes including analysis, compression, or prioritization based on the log data acquired by the data acquirer 621 or the log data read out from the log data memory 631.

The transmission controller 623 performs processing of transmitting, to an external server including the SOC server 30 via the communication interface unit 61, an analysis result, the compressed log data, or the log data given with priority, which has been output from the data processor 622.

(Operation)

(1) Acquisition of Log Data

An information processing operation by the automotive gateway 10 having the above arrangement will be described next. FIG. 3 is a flowchart illustrating an example of the processing procedure and processing contents. Assume that the user terminal 6 is registered in advance as an output destination candidate of the log data in the automotive gateway 10 by, for example, a Bluetooth pairing function.

In the in-vehicle network 1, each ECU 12 and the in-vehicle equipment or device always or periodically monitor their own operation states and the like, and generate log data representing operation histories based on the monitoring results. Furthermore, when the in-vehicle network 1 receives transmission data transmitted from the external network 2, log data representing the reception history of the transmission data is generated.

In step S101, under the control of the log data acquirer 1021, the control unit 102 of the automotive gateway 10 loads the generated log data via the communication interface unit 101, and stores the log data in the log data memory 1031. At this time, the log data acquirer 1021 can be configured to add, to the loaded log data, information for identifying the ECU 12 or the in-vehicle equipment associated with the log data and time stamp information, and then store the log data in the log data memory 1031. The time stamp information may be based on an internal clock or GPS information or based on information obtained by accessing an NTP (Network Time Protocol) server.

The log data acquirer 1021 may store all the acquired data in the log data memory 1031 or may read an ID from a CAN message and perform processing corresponding to the read ID. For example, the log data acquirer 1021 can be configured to relay data, whose destination is an ECU on a specific bus, to the ECU without storing it in the log data memory 1031.

(2) Acquisition of Output Destination Rule

Next, in step S102, under the control of the output destination rule acquirer 1022, the control unit 102 of the automotive gateway 10 acquires a preset output destination rule from an external server or the like via the communication interface unit 101.

The output destination rule is a rule for selectively controlling the output destination of the acquired log data, which has been preset by the system administrator or the like, and may be fixed or updated appropriately. The output destination of the log data includes at least the SOC server 30 and the user terminal 6. The present invention, however, is not limited to them, and the output destination can include other servers (the mobility service server 25, the external server 28, the PSIRT server 40, and the like) connectable via the external network 2 and other nodes. An IP address or identification information of a destination node may be designated as the output destination of the data. Alternatively, a default output destination (the SOC server 30, the user terminal 6, or the like) may be designated by not setting the output destination of the data by the output destination rule. In the embodiment, one or both of the SOC server 30 and the user terminal 6 are designated as output destinations by the output destination rule.

The output destination rule controls the automotive gateway 10 so that log data associated with a specific in-vehicle equipment is output to a specific output destination. Alternatively, the output destination rule may control the automotive gateway 10 so as to designate the output destination in accordance with the type of the log data. The output destination rule may be in a form of a correspondence table for associating, with an output destination, attribute information of the log data including the type of log data and identification information of the in-vehicle equipment associated with the log data.

The output destination rule may control an output destination in accordance with the time stamp information. For example, the output destination rule may control the automotive gateway 10 so that log data acquired during a specific time period is output to a specific output destination. Alternatively, the output destination rule may designate an output destination in accordance with the magnitude of the information amount of log data acquired per unit time. Furthermore, the output destination rule may control to transmit specific log data to a plurality of output destinations.

The output destination rule may control an output destination in accordance with the importance or priority of log data. For example, the automotive gateway 10 can be configured to control the SOC server 30 as an output destination in descending order of priority, and control to set, if a transmission data amount per unit time to the SOC server 30 exceeds a predetermined amount, the output destination of the remaining data to the user terminal 6.

The importance or priority can be set for, for example, each control system associated with the log data. For example, since log data concerning driving of the vehicle such as the engine or suspension control system has high importance, high priority can be set. Since log data concerning control of a power window, air-conditioning, or the like has low importance, low priority can be set. Alternatively, log data having high priority may be transmitted to the user terminal 6. The user terminal 6 can collect log data for a predetermined period, analyze the log data, and then transfer the log data together with the analysis result to the SOC server 30, transmit only the analysis result to the SOC server 30, or transmit the log data to the SOC server 30 after compressing the collected log data to reduce the data amount. Alternatively, log data having high priority may be transmitted to both the SOC server 30 and the user terminal 6. In this case, for example, the SOC server 30 and the user terminal 6 can perform different parallel processes based on the log data.

The output destination rule may designate an output destination based on a request accepted from the SOC server 30 or the user terminal 6. For example, the output destination rule may control the automotive gateway 10 not to output data to the user terminal 6 for a predetermined period when a request is accepted from the user terminal 6. As an example, when the free area of the memory of the user terminal 6 becomes equal to or smaller than a predetermined threshold, it is possible to cause the user terminal 6 to transmit, to the automotive gateway 10, a request to instruct not to transmit data to the user terminal 6. Upon accepting this request, the automotive gateway 10 can perform processing of temporarily excluding the user terminal 6 from the output destination for the period designated by the output destination rule, and control to transmit all the log data to the SOC server 30. Alternatively, the output destination rule may control the automotive gateway 10 not to output data to the SOC server 30 for a predetermined period when a request is accepted from the SOC server 30. As an example, when a failure of the SOC server 30 or a network failure occurs, it is possible to cause the SOC server 30 to transmit, to the automotive gateway 10, a request to instruct not to transmit data to the SOC server 30. Upon accepting this request, the automotive gateway 10 can perform processing of temporarily excluding the SOC server 30 from the output destination for the period designated by the output destination rule, and transmitting all the data to the user terminal 6 or selecting another server as an output destination.

Alternatively, the output destination rule may control the automotive gateway 10 to decide an output destination based on the magnitude of an information amount acquired per unit time by the log data acquirer 1021. For example, the control unit 102 of the automotive gateway 10 can read out, under a condition designated by the output destination rule, log data for a predetermined period accumulated in the log data memory 1031, divide the log data based on identification information of the in-vehicle equipment associated with the readout log data, calculate the information amount of each divided log data, and control to transmit, to the SOC server 30, the log data whose information amount exceeds a specific threshold and transmit the remaining log data to the user terminal 6.

The output destination rule may be stored in advance as part of a routing table normally provided in the automotive gateway 10, and the log data acquirer 1021 may decide an output destination by extracting information from the routing table. Alternatively, the log data acquirer 1021 may acquire the output destination rule in a form of a correspondence table from an external storage medium such as a USB memory.

(3) Decision of Output Destination

Next, in step S103, under the control of the output destination decider 1023, the control unit 102 of the automotive gateway 10 reads out the log data stored in the log data memory 1031, and decides the output destination of the log data based on the output destination rule acquired by the output destination rule acquirer 1022. For example, the output destination decider 1023 reads out the identification information of the associated in-vehicle equipment and the time stamp information from the target log data, and collates them with the output destination rule in the form of the correspondence table, thereby deciding the output destination of the log data. In the embodiment, the output destination is selectively decided between the SOC server 30 and the user terminal 6.

(4) Reduction of Information Amount

Next, in step S104, under the control of the information amount reduction processor 1024, the control unit 102 of the automotive gateway 10 performs processing of reducing the information amount of the transmission target log data, as needed. For the information amount reduction processing, for example, statistic calculation, sampling, filtering processing, data compression, and the like can be used. Step S104 is optional, and may be skipped or selectively executed in accordance with the output destination or the output target log data.

(5) Output

Next, in step S105, under the control of the output controller 1025, the control unit 102 of the automotive gateway 10 performs processing of generating transmission data and outputting it. For example, the output controller 1025 generates transmission data by adding a destination IP address and other necessary information to the output target log data, and outputs the generated transmission data via the communication interface unit 101. At this time, the automotive gateway 10 can output a signal after executing necessary control such as protocol or rate conversion.

The output controller 1025 may add identification information of the associated ECU to the output target log data. This makes it possible to analyze the log data in association with the ECU in the SOC server 30 or the user terminal 6. The output controller 1025 may be configured to link GPS position information of the vehicle with the log data and transmit it. This makes it possible to analyze the log data in association with the position information in the SOC server 30 or the user terminal 6.

Note that the automotive gateway 10 can transmit data to the SOC server 30 through, for example, the mobile communication network 22 via the TCU 14. On the other hand, for example, the automotive gateway 10 can transmit data to the user terminal 6 directly via the communication interface unit 101 or through short-distance wireless communication such as Bluetooth, BLE, or Wi-Fi via the navigation device 111.

Alternatively, data may be transmitted to the SOC server 30 through road-to-vehicle communication via V2X15 or the like. In road-to-vehicle communication, the vehicle can perform data communication complying with a communication standard such as WAVE (Wireless Access in Vehicular Environments) or ETSI ITS G5 with a road-side equipment installed on the side of a road on which the vehicle travels. Log data transmitted from the vehicle is sent to various servers including the SOC server 30 via the network by the road-side equipment installed on the side of the road.

(6) Processing by User Terminal

Next, an information processing operation by the user terminal 6 which has received the log data transmitted from the automotive gateway 10 will be described. FIG. 5 is a flowchart illustrating an example of the processing procedure and processing contents.

In step S201, under the control of the data acquirer 621, the user terminal 6 receives the log data from the automotive gateway 10 via the communication interface unit 101 of the automotive gateway 10 or the Bluetooth interface 172 of the navigation device 111 connected to the automotive gateway 10.

Next, in step S202, under the control of the data processor 622, the user terminal 6 executes various processes for the received log data. In the embodiment, the data processor 622 can read out the analysis criterion stored in the analysis criterion memory 632, and perform, for the log data, predetermined analysis processing for every predetermined amount or every predetermined period. For example, the data processor 622 is configured to detect occurrence of an abnormality when the log data exceeding a threshold read out as the analysis criterion is detected, and output the result to the transmission controller 623. Alternatively, the data processor 622 is configured to perform trend analysis of the log data based on a reference waveform read out as the analysis criterion, and output the analysis result to the transmission controller 623. Alternatively, the data processor 622 may be configured to detect the presence/absence of a predetermined obstacle or extract an image including a predetermined obstacle based on a reference image read out as the analysis criterion.

Alternatively, the data processor 622 can perform, for the log data, arbitrary compression processing (for example, sampling, statistic calculation, encoding, or the like) for every predetermined amount or every predetermined period, thereby reducing the data amount. Alternatively, the data processor 622 can prioritize the log data by, for example, identifying the attribute information of the log data and giving priority corresponding to the attribute information. For example, the data processor 622 is configured to give high priority to the log data which needs to be transferred to the SOC server 30 with a low delay based on the preset criterion.

Processing to be executed by the data processor 622 may be preset by the owner of the user terminal 6, or an instruction input by the administrator of the SOC server 30 may be received and processing corresponding to the instruction may be executed.

Next, in step S203, under the control of the transmission controller 623, the user terminal 6 performs processing of transmitting, to the SOC server 30, the analysis result, the compressed log data, or the log data given with priority, which has been output from the data processor 622. The output destination from the transmission controller 623 is not limited to the SOC server 30, and the data may be transmitted to another arbitrary external equipment or may be displayed on the display unit of the user terminal 6.

(Effect)

As described in detail above, in the embodiment, the automotive gateway 10 used together with the in-vehicle network 1 selectively controls the output destination of the log data concerning the operation state of the in-vehicle device generated in the in-vehicle network 1 to be one or both of the SOC server 30 and the user terminal 6 in accordance with the preset output destination rule.

According to the embodiment, as compared with a case in which an enormous amount of log data incessantly collected is all transmitted to the SOC server 30, it is possible to selectively control the output destination and suppress an increase in traffic in the network per unit time.

For example, the automotive gateway 10 can control to set the SOC server 30 as the output destination with respect to data having high importance such as log data concerning the operation of the engine, or log data required to be analyzed in real time, and to set, as the output destination, the user terminal 6 held by the driver of the vehicle with respect to log data having low importance such as data concerning lighting of a headlight or opening/closing of a power window. Even data having low importance and not required to be analyzed in real time may be useful to detect an abnormality such as an operation failure of the equipment or malware infection by accumulating a predetermined amount of data. Such data can be accumulated temporarily in the user terminal 6 and transferred to the SOC server 30 via the external network 2 appropriately during, for example, a time period in which a communication amount is small or a time period in which a communication fee is low.

Alternatively, upon receiving the log data from the automotive gateway 10, the user terminal 6 can perform compression processing for the accumulated data to reduce the information amount, and then transfer the data to the SOC server 30. The user terminal 6 can also be configured to perform data analysis using an application program installed in the user terminal 6, and transmit, to the SOC server 30, only the analysis result or only alert information when an abnormality is detected. For example, part of the log data output from the vehicle can be accumulated in the smartphone held by the driver, and an application of the smartphone can prioritize the log data, thereby preferentially transferring the important log data concerning the security to the SOC server 30. This can make an attempt to distribute the load of the data processing.

It is expected to implement the immediacy of feedback such as abnormality detection by locally performing calculation processing in the user terminal 6 which has received the log data from the automotive gateway 10. For example, it is possible to early notify the user of an operation abnormality of the headlight control ECU by associating time information and the lighting status of the headlight with each other. Alternatively, the immediacy of handling, for example, prompting the user to make contact with a dealer or the like in accordance with the importance, is also expected. Furthermore, if the owner of the vehicle holds the user terminal 6 such as a smartphone as the output destination of the log data, even if the owner is away from the vehicle, it is possible to immediately notify the owner of occurrence of an abnormality such as an unusual rise in temperature or connection of an unregistered device to a USB socket, thereby making the owner perform confirmation before the start of driving.

In addition, by sending information to a smartphone or the like also connectable to a wide area network such as the Internet 27, the driver can readily perform online diagnosis by, for example, transmitting alert information to the Web site of the vehicle manufacturer or dealer.

As described above, by providing a function of sorting the log data transmission destinations in the automotive gateway 10, an enormous amount of log data collected as the overall system is distributed and transmitted, thereby reducing the traffic and also implementing function distribution or processing distribution.

Other Embodiments

Note that the present invention is not limited to the above-described embodiment.

In the above description, the vehicle information processing apparatus according to the embodiment is implemented as the automotive gateway 10. However, the vehicle information processing apparatus may be implemented as a function expansion device externally attached to the automotive gateway 10 or as an apparatus separated from the automotive gateway 10. For example, the vehicle information processing apparatus may be implemented as an expansion unit of the navigation device 111.

Alternatively, each control function unit of the vehicle information processing apparatus may be distributed and arranged in the gateway, ECU, or another in-vehicle device, and these units may perform processing in cooperation with each other. Each control function unit of the vehicle information processing apparatus may be implemented as an expansion function of a dedicated application program installed in advance in the information processing apparatus including the user terminal 6.

In addition to the automotive gateway 10 functioning as the central gateway, an additional gateway can be provided between buses. Similarly, the arrangement of the in-vehicle network 1 is not limited to that shown in FIG. 1, and a LIN (Local Interconnect Network) can also be used in addition to the CAN.

In the above-description, the user terminal 6 can transmit/receive data to/from the automotive gateway 10 directly or via the Bluetooth interface 172 of the navigation device 111. The present invention, however, is not limited to this. For example, the user terminal 6 may be communicable with the automotive gateway 10 in accordance with another wireless communication standard including Wi-Fi, and may be able to transmit/receive data to/from the automotive gateway 10 by wired connection through the USB port 171 of the navigation device 111 or the like.

Furthermore, connection between the in-vehicle network 1 and the external network 2 is not limited to that shown in FIG. 1. For example, the in-vehicle network 1 can access the Internet 27 directly without intervention of the closed network.

The output destination designated by the output destination rule is not limited to only the SOC server 30 or the user terminal 6, and can include another node as an output destination. The output destination rule may instruct information compression processing in the automotive gateway 10 in addition to designation of the output destination.

By arbitrarily setting the output destination rule, it is possible to perform distribution processing according to the importance and properties of the log data. For example, the log data is output to the SOC server 30 in descending order of priority, only the log data having high priority is output to the SOC server 30, the log data having high priority is output to the SOC server 30 via the user terminal 6, or the log data is output after compressing the information amount while ensuring the continuity of the log data in the automotive gateway 10. Furthermore, the driver may be able to operate the smartphone as the user terminal 6 to select data to be sent from the smartphone to the SOC server 30. Alternatively, the output destination rule stored in the automotive gateway 10 may be set or updated remotely from the side of the SOC server 30. Note that when transmitting data from the smartphone to the network, it is possible to link the log data with the vehicle identification information in the SOC server 30 by adding the owner information of the smartphone to the output data.

In addition, the form of the output destination rule and the like can be variously modified within the spirit and scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

REFERENCE SIGNS LIST

1 . . . in-vehicle network
2 . . . external network
5 . . . USB memory
6 . . . user terminal
10 . . . automotive gateway
12 . . . ECU
14 . . . communication control unit (TCU)
15 . . . sensor interface (V2X)
16 . . . external interface port (OBD-2)
20 . . . mobility service network
21, 26 . . . gateway
22 . . . mobile communication network
25 . . . mobility service server
27 . . . Internet
28 . . . external server
30 . . . SOC server
40 . . . PSIRT server
61 . . . communication interface unit
62 . . . control unit
63 . . . memory unit

101 . . . communication interface unit
102 . . . control unit
103 . . . memory unit
111 . . . navigation device
141 . . . wireless unit
171 . . . USB port
172 . . . Bluetooth interface
173 . . . Wi-Fi interface
621 . . . data acquirer
622 . . . data processor
623 . . . transmission controller
631 . . . log data memory
632 . . . analysis criterion memory
1021 . . . log data acquirer
1022 . . . output destination rule acquirer
1023 . . . output destination decider
1024 . . . information amount reduction processor
1025 . . . output controller
1031 . . . log data memory

The invention claimed is:

1. An apparatus comprising:
a controller comprising a hardware processor configured to implement at least:
a log data acquirer configured to acquire log data concerning an operation state of an in-vehicle device from an in-vehicle network; and
a transmission destination controller configured to control to set, based on a preset transmission destination rule, a transmission destination of the acquired log data to one or both of a user terminal connectable to the in-vehicle network and a vehicle security monitoring device communicable with the in-vehicle network without intervention of the user terminal, the transmission destination rule being a rule for selectively controlling the transmission destination of the acquired data to one or both of the user terminal and the vehicle security monitoring device so as to reduce network traffic, the user terminal being separate from a vehicle, the vehicle security monitoring device being separate from the vehicle and being remotely located outside the vehicle,
wherein the in-vehicle network is configured to generate a plurality of log data concerning respective operation states of a plurality of in-vehicle devices,
wherein the log data acquirer acquires the plurality of log data generated by the in-vehicle network,
wherein the transmission destination controller sets, based on the preset transmission destination rule, a transmission destination for each of the plurality of log data acquired by the log data acquirer to:
the user terminal that is connectable to the in-vehicle network and the vehicle security monitoring device without communication of the log data to the vehicle security monitoring device, the user terminal being configured to be separate from the vehicle and to move together with the apparatus,
the vehicle security monitoring device communicable with the in-vehicle network without communication of the log data to the user terminal, the vehicle security monitoring device being separate from the vehicle and being remotely located outside the vehicle, or
both the user terminal and the vehicle security monitoring device, wherein the transmission destination controller controls the transmission destination of the log data based on priority set for each generation source in-vehicle device of the log data, wherein the transmission destination controller controls the transmission destination of the log data in accordance with one of a request, sent from the vehicle security monitoring device, to instruct not to transmit the log data to the vehicle security monitoring device for a predetermined period, and a request, accepted from the user terminal, to instruct not to transmit the log data to the user terminal for a predetermined period, and wherein the transmission destination controller controls the transmission destination of the log data based on a magnitude of an information amount of the log data acquired per unit time for each generation source in-vehicle device of the log data.

2. The apparatus of claim 1, further comprising:

a memory configured to accumulate the acquired log data; and an information amount reduction processor configured to perform processing of reading out the accumulated log data from the memory for every predetermined amount and reducing an information amount of the log data before transmit to the transmission destination.

3. The apparatus according to claim 1, wherein the user terminal is further configured to generate information based on the log data, present the generated information to user, or transmit to the vehicle security monitoring device.

4. A method comprising the steps of:

acquiring log data concerning an operation state of an in-vehicle device from an in-vehicle network, wherein the in-vehicle device is one of a plurality of in-vehicle devices within the in-vehicle network; and controlling to set, based on a preset transmission destination rule, a transmission destination of the acquired log data to one or both of a user terminal connectable to the in-vehicle network and a vehicle security monitoring device communicable with the in-vehicle network without intervention of the user terminal, wherein the transmission destination of the acquired log data is set based on a priority set for each in-vehicle device of the plurality of in-vehicle devices that generates the log data and wherein the transmission destination rule being a rule for selectively controlling the transmission destination of the acquired log data to one or both of the user terminal and the vehicle security monitoring device so as to reduce network traffic, and wherein the user terminal is configured to move with a vehicle including the in-vehicle device, the user terminal being separate from the vehicle, the vehicle security monitoring device being separate from the vehicle and being remotely located outside the vehicle, wherein the transmission destination of the log data is set in accordance with one of a request, sent from the vehicle security monitoring device, to instruct not to transmit the log data to the vehicle security monitoring device for a predetermined period, and a request, accepted from the user terminal, to instruct not to transmit the log data to the user terminal for a predetermined period, and wherein the transmission destination of the log data is set based on a magnitude of an information amount of the log data acquired per unit time for each generation source in-vehicle device of the log data.

5. A non-transitory computer readable medium storing a computer program which is executed by a computer to provide the steps of:

acquiring log data concerning an operation state of an in-vehicle device from an in-vehicle network, wherein the in-vehicle device is one of a plurality of in-vehicle devices within the in-vehicle network; and controlling to set, based on a preset transmission destination rule, a transmission destination of the acquired log data to one or both of a user terminal connectable to the in-vehicle network and a vehicle security monitoring device communicable with the in-vehicle network without intervention of the user terminal, wherein the transmission destination of the acquired log data is set based on a priority set for each in-vehicle device of the plurality of in-vehicle devices that generates the log data, and wherein the transmission destination rule being a rule for selectively controlling the transmission destination of the acquired data to one or both of the user terminal and the vehicle security monitoring device so as to reduce network traffic, and wherein the user terminal is configured to move with a vehicle including the in-vehicle device, the user terminal being separate from the vehicle, the vehicle security monitoring device being separate from the vehicle and being remotely located outside the vehicle, wherein the transmission destination of the log data is set in accordance with one of a request, sent from the vehicle security monitoring device, to instruct not to transmit the log data to the vehicle security monitoring device for a predetermined period, and a request, accepted from the user terminal, to instruct not to transmit the log data to the user terminal for a predetermined period, and wherein the transmission destination of the log data is set based on a magnitude of an information amount of the log data acquired per unit time for each generation source in-vehicle device of the log data.

* * * * *